(12) United States Patent
Zhou et al.

(10) Patent No.: US 8,009,932 B2
(45) Date of Patent: Aug. 30, 2011

(54) AUTOMATIC ALIGNMENT OF VIDEO FRAMES FOR IMAGE PROCESSING

(75) Inventors: Liming Zhou, Baton Rouge, LA (US); Yousheng Zeng, Plano, TX (US)

(73) Assignee: Providence Engineering and Environmental Group LLC, Baton Rouge, LA (US)

( * ) Notice: Subject to any disclaimer, the term of this patent is extended or adjusted under 35 U.S.C. 154(b) by 1023 days.

(21) Appl. No.: 11/898,219

(22) Filed: Sep. 10, 2007

(65) Prior Publication Data

US 2008/0063298 A1    Mar. 13, 2008

Related U.S. Application Data

(60) Provisional application No. 60/825,463, filed on Sep. 13, 2006.

(51) Int. Cl.
*G06K 9/32* (2006.01)

(52) U.S. Cl. ........ 382/294; 382/154; 382/128; 382/131; 382/284

(58) Field of Classification Search ........................ None
See application file for complete search history.

(56) References Cited

U.S. PATENT DOCUMENTS

| | | | |
|---|---|---|---|
| 5,633,951 A * | 5/1997 | Moshfeghi | 382/154 |
| 6,049,622 A * | 4/2000 | Robb et al. | 382/128 |
| 6,373,970 B1 * | 4/2002 | Dong et al. | 382/128 |
| 6,396,876 B1 * | 5/2002 | Babonneau et al. | 375/240.29 |
| 6,587,598 B1 * | 7/2003 | Devillers et al. | 382/284 |
| 6,628,845 B1 * | 9/2003 | Stone et al. | 382/294 |
| 2002/0122576 A1 * | 9/2002 | Weese et al. | 382/131 |
| 2004/0131249 A1 * | 7/2004 | Sandrew | 382/162 |
| 2005/0157949 A1 * | 7/2005 | Aiso et al. | 382/299 |
| 2006/0152589 A1 * | 7/2006 | Morrison et al. | 348/208.1 |
| 2008/0019611 A1 * | 1/2008 | Larkin et al. | 382/287 |
| 2008/0037845 A1 * | 2/2008 | Deuerling-Zheng et al. | 382/130 |

* cited by examiner

*Primary Examiner* — Anand Bhatnagar
*Assistant Examiner* — Tsung-Yin Tsai
(74) *Attorney, Agent, or Firm* — Robert E. Bushnell, Esq.

(57) ABSTRACT

The provided is a method that can automatically align image frames in recorded video clips. Individual frames in video may shift and rotate due to shaking or vibration of a video camera. Unaligned frames make some imaging processing techniques difficult or infeasible. One example of image processing techniques is to isolate, recognize, and/or quantitatively analyze vapor plume images captured by an Infrared (IR) camera. Such techniques have a great potential to be used to automatically detect volatile organic compounds (VOC) leaked from process equipment at refineries and chemical plants. This invention is a technique for various subsequent image processing techniques. The invention uses spatially based Fast Fourier Transforms (FFT) to determine amount of shift, rotation, and scaling to align image frames, and uses a digital filtering technique to improve the alignment.

19 Claims, 9 Drawing Sheets

FIG. 5A
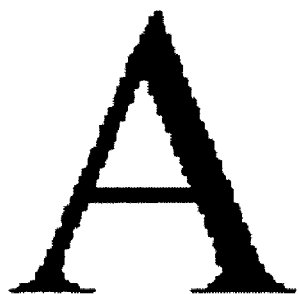
FIG. 5B
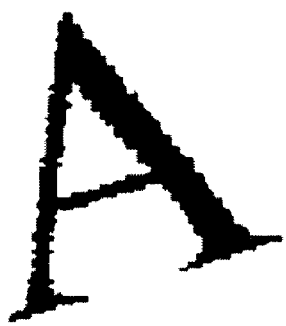
FIG. 5C
FIG. 5D

AUTOMATIC ALIGNMENT OF VIDEO FRAMES FOR IMAGE PROCESSING

CLAIM OF PRIORITY

This application claims priority under 35 U.S.C. §119 to Provisional Patent Application No. 60/825,463, entitled "AUTOMATIC ALIGNMENT OF VIDEO FRAMES FOR IMAGE PROCESSING" filed on Sep. 13, 2006, which application is incorporated herein by reference.

BACKGROUND OF THE INVENTION

1. Field of the Invention

The present invention relates to an alignment method to align one image frame with another image frame, and an alignment system that aligns one image frame with another image frame. In particular, the alignment method of the present invention can automatically align image frames in recorded video clips, and the alignment system includes a machine readable storage medium that provides instructions that cause the machine to perform operations to align image frames.

2. Description of the Related Art

Recently, infrared (IR) video cameras have been investigated for volatile organic compounds (VOC) leak detection as a cost-effective alternative. The approach of using IR cameras for leak detection is often referred to as a smart leak detection and repair (LDAR). These cameras are operated at a predetermined wavelength band with strong VOC absorptions. All background objects emit or reflect IR rays with various intensity at the camera's wavelength band, causing formation of a background image on the detector array of the camera. When VOC is emitted from a leaking component, the VOC vapor forms a plume in the atmosphere. If the VOC plume is in between the background and the camera, the VOC will absorb the IR rays emitted or reflected by the background objects. The absorption will make the plume appear as "smoke" in front of background in the image captured by the IR camera. The intensities of the plume image pixels depend on the gas concentration and camera sensitivity. This kind of cameras can be operated manually by operators to scan possible leaking components. Usually, several seconds of video length are enough for an operator to identify the leaking gas plume within an area covered by the viewfinder of the camera. The camera can also be mounted at a fixed location to continuously monitor a large operational area within a refinery or a chemical plant. The fugitive VOC emissions due to leak in equipment can be reduced if the leaking equipment can be found easily and repaired promptly, because the duration of leaking is minimized.

To improve accuracy and to further reduce labor cost, it is desirable to process the IR video automatically. The IR video data processing includes automatic identification of VOC plume in a non-attendant manner, quantification of the relationship between the image and the actual VOC leaking rate, and compression of the video images to save data storage space.

In order to accomplish some of these automated tasks, frames in the IR video need to be closely aligned to the same frame of reference. A video footage consists of many frames. These frames in a raw video footage are usually not in the same reference spatially as the camera shift positions during recording. When the camera experience moving, shaking, or vibration, a frame may capture a slightly different scene compared to its immediate preceding frame, or the captured scene may be rotated. The unstable camera may be caused by the operator, process equipment, or strong wind if it is mounted on a tall structure. For practical industrial applications, this vibration becomes inevitable and the unaligned frames will make those image processing algorithms fail. Therefore, the video frames have to be aligned before a quantitative processing can be performed.

To transform an image to match another image is called image registration. The alignment of the video frames includes a series of image registration process. At present, all image processing software packages use manually selected control points for image registration, and only provide local registration.

Therefore, in order to solve the problems mentioned above, the present invention provides a method for automatically aligning images frames and an alignment system that automatically aligns image frame.

SUMMARY OF THE INVENTION

A video is a sequence of image frames recorded and displayed at a certain rate. When a video is taken, the video camera may inevitably shake or vibrate, causing shift or rotation of spatial reference point from one frame to the next. In this case, the frames in the video will not be aligned, which will make further automated image process or analysis of images difficult and infeasible. The present invention provides a method that can automatically align frames in recorded video clips. The present invention also provides an apparatus that employs the method to align frames of the recorded video.

It is, therefore, an objective of the present invention to provide a method for aligning one image frame to another image frame that are recorded in a video clip. Even though a camera slightly moves during recording, the recorded images can be realigned, which will reduce errors in further automated image processes.

It is another objective of the present invention to provide a method for automatically aligning image frames. Therefore, the method will improve stability and efficiency in the analysis of the recoded images.

It is another objective of the present invention to provide an image alignment system that can include a machine readable storage medium that provides instructions that cause the machine to perform operations to align image frames. The image alignment system automatically aligns one image frame to another image frame that are recorded in a video clip.

According to one aspect of the present invention, a method of aligning one image frame with another image frame is provided. The method for aligning image frames includes steps of selecting a reference image, selecting a sample image to be aligned to the reference image, Fourier-transforming the reference image to obtain a Fourier transform of the reference image, Fourier-transforming the sample image to obtain a Fourier transform of the sample image, coordinate-transforming an absolute value of the Fourier transform of the reference image to obtain a coordinate-transformed Fourier transform of the reference image, coordinate-transforming an absolute value of the Fourier transform of the sample image to obtain a coordinate-transformed Fourier transform of the sample image, obtaining a first phase shift from the coordinate-transformed Fourier transform of the reference image and the coordinate-transformed Fourier transform of the sample image, inverse-Fourier-transforming the first phase shift to obtain an inverse Fourier transform of the first phase shift, finding a first transformation factor from the inverse Fourier transform of the first phase shift, transforming the sample image by the first transformation factor to obtain a first-transformed sample image, Fourier-transforming the first-transformed sample image to obtain a Fourier transform of the first-transformed sample image, obtaining a second phase shift from the Fourier transform of the reference image and the Fourier transform of the first-transformed sample image, inverse-Fourier-transforming the second phase shift to obtain an inverse Fourier transform of the second phase shift, finding a second transformation factor from the inverse Fourier transform of the second phase shift, and transforming the first-transformed sample image by the second transformation factor.

Each of the reference image and the sample image may be represented in Cartesian coordinates. The step of coordinate-transforming the Fourier transform of the reference image may include a step of transforming an absolute value of the Fourier transform of the reference image from Cartesian coordinates to log-polar coordinates. The step of coordinate-transforming the Fourier transform of the sample image may include a step of transforming an absolute value of the Fourier transform of the sample image from Cartesian coordinates to log-polar coordinates.

The first transformation factor may include a rotational shift, by which the sample image is rotated to be aligned to the reference image. The second transformation factor may include a translational shift, by which the sample image is translated to be aligned to the reference image. The first transformation factor may include a scaling factor, by which the sample image is rescaled to be aligned to the reference image.

According to another aspect of the present invention, a machine readable storage medium providing instructions that cause the machine to perform operations to align image frames is provided. The operations includes selecting a reference image, selecting a sample image to be aligned to the reference image, Fourier-transforming the reference image to obtain a Fourier transform of the reference image, Fourier-transforming the sample image to obtain a Fourier transform of the sample image, coordinate-transforming an absolute value of the Fourier transform of the reference image to obtain a coordinate-transformed Fourier transform of the reference image, coordinate-transforming an absolute value of the Fourier transform of the sample image to obtain a coordinate-transformed Fourier transform of the sample image, obtaining a first phase shift from the coordinate-transformed Fourier transform of the reference image and the coordinate-transformed Fourier transform of the sample image, inverse-Fourier-transforming the first phase shift to obtain an inverse Fourier transform of the first phase shift, finding a first transformation factor from the inverse Fourier transform of the first phase shift, transforming the sample image by the first transformation factor to obtain a first-transformed sample image, Fourier-transforming the first-transformed sample image to obtain a Fourier transform of the first-transformed sample image, obtaining a second phase shift from the Fourier transform of the reference image and the Fourier transform of the first-transformed sample image, inverse-Fourier-transforming the second phase shift to obtain an inverse Fourier transform of the second phase shift, finding a second transformation factor from the inverse Fourier transform of the second phase shift, and transforming the first-transformed sample image by the second transformation factor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

FIG. 5A shows a reference image of a first example of the alignment method of the present invention.

FIG. 5B shows a sample image of the first example that is to be aligned to the reference image of FIG. 5A.

FIG. 5C shows an overlay of the images of FIGS. 5A and 5B.

FIG. 5D shows an overlay of the image of FIG. 5A and a transformed image of FIG. 5B that is transformed according to the alignment method of the present invention.

DETAILED DESCRIPTION OF THE INVENTION

The present invention will now be described with reference to the accompanying drawings, in which an exemplary embodiment of the invention is shown.

A spatially based fast Fourier transform (FFT) is applied to a pair of image frames. A phase shift between the Fourier transforms of the two images is calculated. A Dirac delta function is then calculated by performing an inverse Fourier transform to the phase shift. The location of the maximum value of the delta function will indicate amount of shift that is needed to align the two frames. When this procedure is performed in Cartesian coordinates, the delta function will provide translational shift (i.e., shift in x and y directions). When the images are converted from Cartesian coordinates to log-polar coordinates, and this procedure is performed in log-polar coordinates, the delta function will provide rotational shift (i.e., rotation by an angle) and scaling factor. When the amount of translational shift, rotational shift, and scaling factor, which can be generally referred to as transformation factors, are applied to one of the images, this image will be shifted to become aligned with a reference image. The accuracy of the alignment can be within one pixel, or can be a fraction of a pixel.

Figure 1:
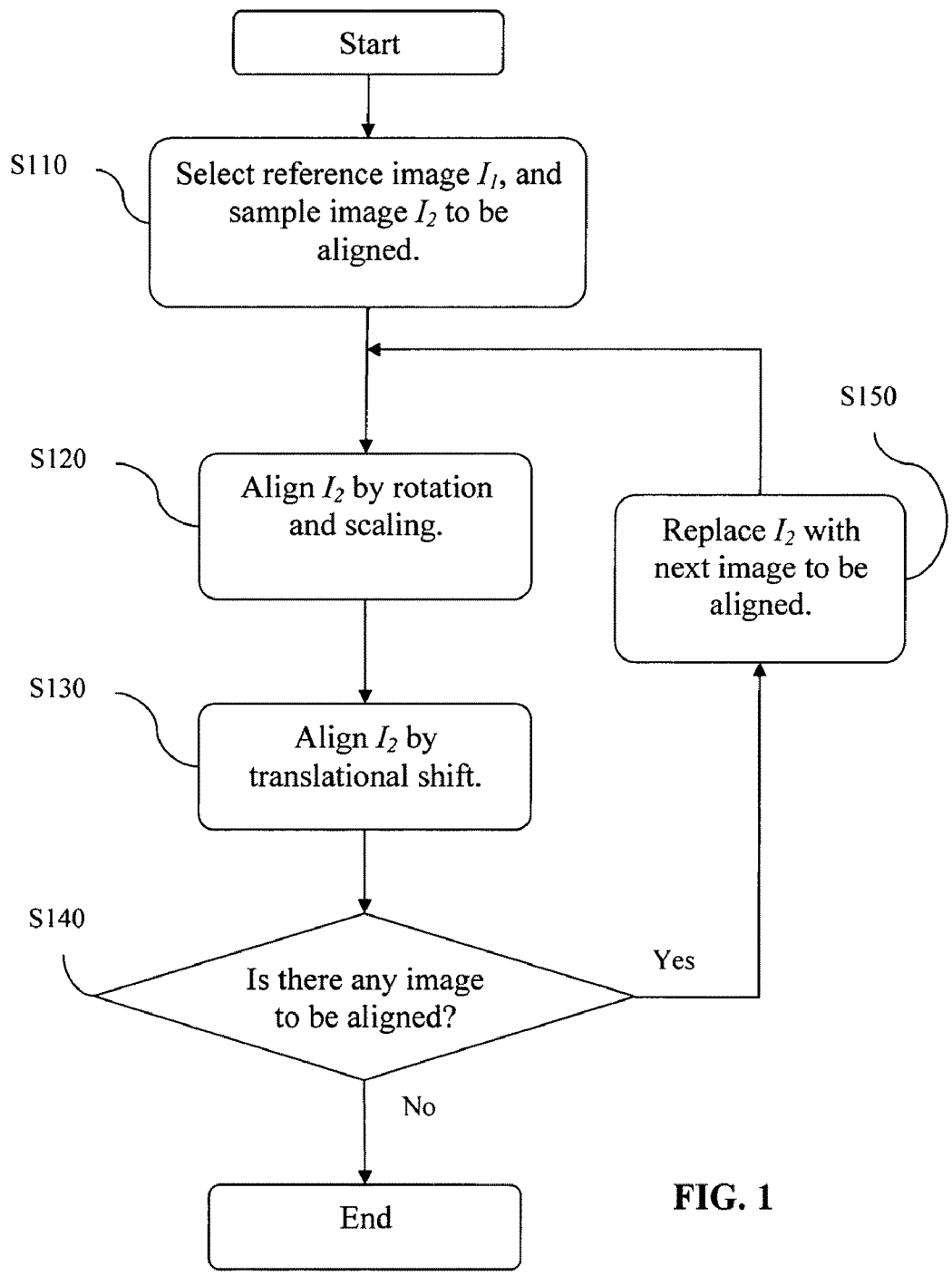
FIG. 1 shows a process that illustrates steps of aligning one image frame to another image frame, which is constructed as an embodiment of the present invention.

FIG. 1 shows a process that illustrates steps of aligning one image frame to another image frame, which is constructed as an embodiment of the present invention. As described above, this process includes two major processes: alignment by translational shift and alignment by rotation and scaling. Referring to FIG. 1, a reference image $I_1$ and a sample image $I_2$ are selected in step S110. The reference image $I_1$ is set as a reference, and the sample image $I_2$ is transformed to be aligned to the reference image $I_1$.

In step 120, alignment by rotation and scaling is performed. This procedure is to align a sample image $I_2$ with a reference image $I_1$ by rotating or scaling the sample image $I_2$ to match the reference image $I_1$. Scaling is enlarging or reducing the size of an image (i.e., zooming in and zooming out). This procedure can determine how much the rotation angle (or called rotational shift) and scaling factor are needed to align the two images.

In step 130, alignment by translational shift is performed. This procedure is to align the sample image $I_2$ with the reference image $I_1$ by shifting the sample image $I_2$ up/down and left/right (i.e., in x and y directions) without rotating or resizing the sample image $I_2$. This shift is called a translational shift. This procedure is based on Fourier phase transfer theorem and can determine how much shift is needed to align the two images.

After the sample image $I_2$ is aligned to the reference image $I_1$, in step S140, it is determined whether there is any more image to be aligned. If there is no image to be aligned, the process ends. Otherwise, the process continues to align next image. The next image to be aligned is set as a sample image $I_2$ in step S150. The same steps S120 and S130 are processed to align the new sample image $I_2$ with the reference image $I_1$. This process continues until there is no image to be aligned. The reference image frame is not updated to avoid accumulated errors.

The processes of the alignment by translational shift and the alignment by rotation and scaling will be described in detail referring to FIGS. 2A and 2B.

Figure 2A:
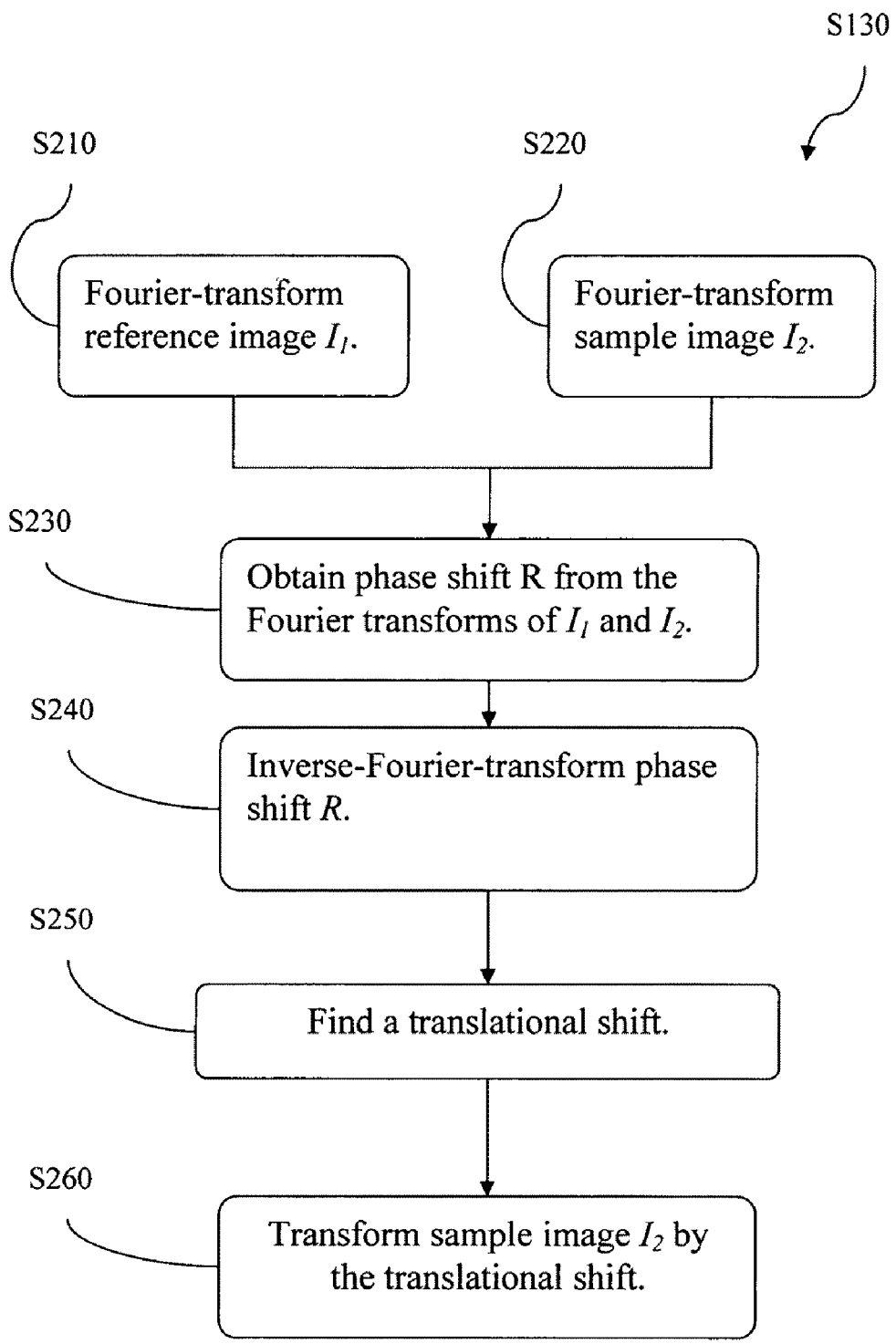
FIG. 2A shows steps of the process of the alignment by translational shift.

FIG. 2A shows steps of the process of the alignment by translational shift S130. This procedure is to align a sample image with a reference image by shifting the sample image up/down and left/right without rotating or resizing the images. This shift is called translational shift. This procedure is based on Fourier phase transfer theorem and can determine how much shift is needed to align the two images.

Once a reference image $I_1$ and a sample image $I_2$ are prepared as shown in step S110 of FIG. 1, the reference image $I_1$ and the sample image $I_2$ are Fourier-transformed as shown in steps S210 and S220, respectively. If the sample image $I_2$ is shifted from the reference image $I_1$ by translation (dx, dy), the two images have the relationship as shown in Equation 1.

$$I_2(x,y)=I_1(x-dx,y-dy)$$ Equation 1

The Fourier transform $F_1$ of the image $I_1$ and the Fourier transform $F_2$ of the image $I_2$ are related as shown in Equation 2.

$$F_2(\xi,\eta)=e^{-j2\pi(\xi \cdot dx+\eta \cdot dy)} \cdot F_1(\xi,\eta)$$ Equation 2 where $\xi$ and $\eta$ are a vertical and a horizontal frequencies, respectively.

In step S230, a translational phase shift R of the two images $I_1$ and $I_2$ is obtained. The translational phase shift R can be obtained from Equation 3.

$$R = e^{-j2\pi(\xi \cdot dx+\eta \cdot dy)} = \frac{F_1(\xi,\eta) \cdot conj(F_2(\xi,\eta))}{abs(F_1(\xi,\eta)) \cdot abs(F_2(\xi,\eta))}$$ Equation 3 where conj is a complex conjugate and abs is an absolute value. In step S240, the phase shift R is inverse-Fourier-transformed. The inverse Fourier transform of the phase shift R results in a Dirac delta function with an offset that is the same as the translational motion as shown in Equation 4.

$$\delta(x-dx,y-dy)=F^{-1}(R)=F^{-1}(e^{-j2\pi(\xi \cdot dx+\eta \cdot dy)})=P$$ Equation 4

Figure 3:
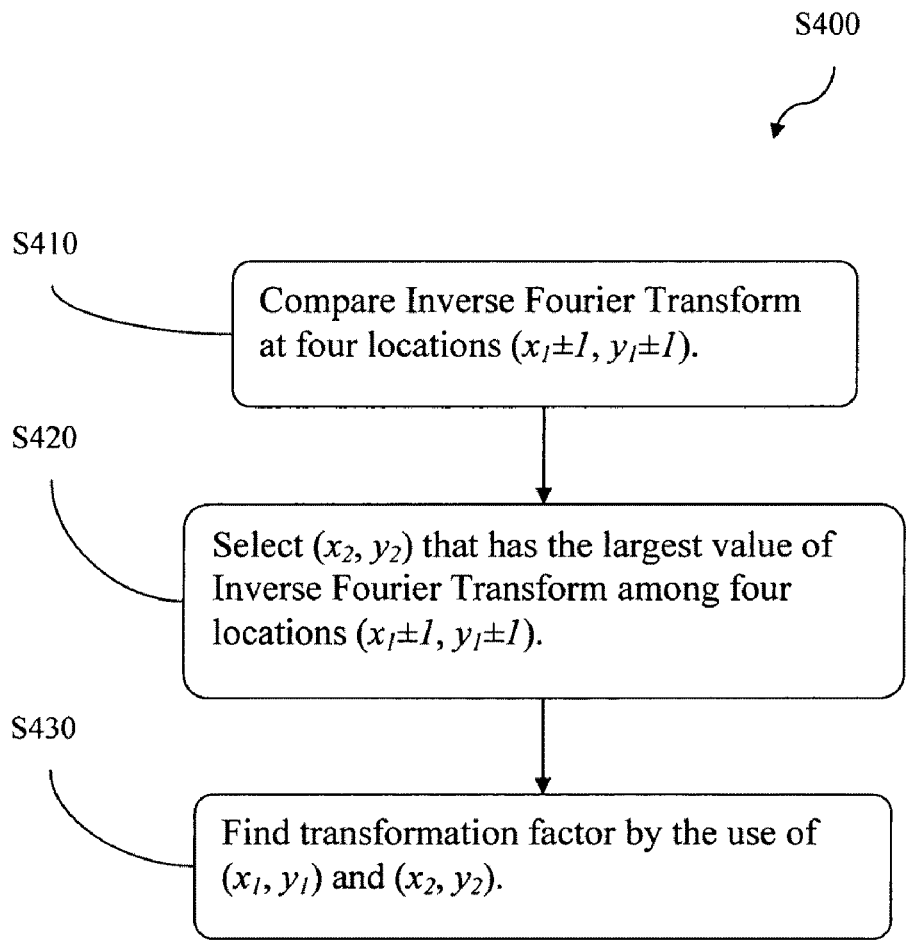
FIG. 3 shows a refinement process to align the images in a fraction of a pixel.

In step S250, the translational shift is found by finding a location at which the Dirac delta function has a peak value. Specifically, a location $(x_1, y_1)$, at which the Dirac delta function is maximized, is found. By finding the location of the maximum P value, the translational amount can be determined. The process described through steps S210 to S250 gives an accuracy of one pixel. In step S260, the sample image $I_2$ is transformed by the translational shift that is found in step S250. In order to improve the accuracy of the alignment within a fraction of a pixel, refinement process S400, which is shown in FIG. 3, can be further performed. The refinement process 400 will be described later referring to FIG. 3.

Figure 2B:
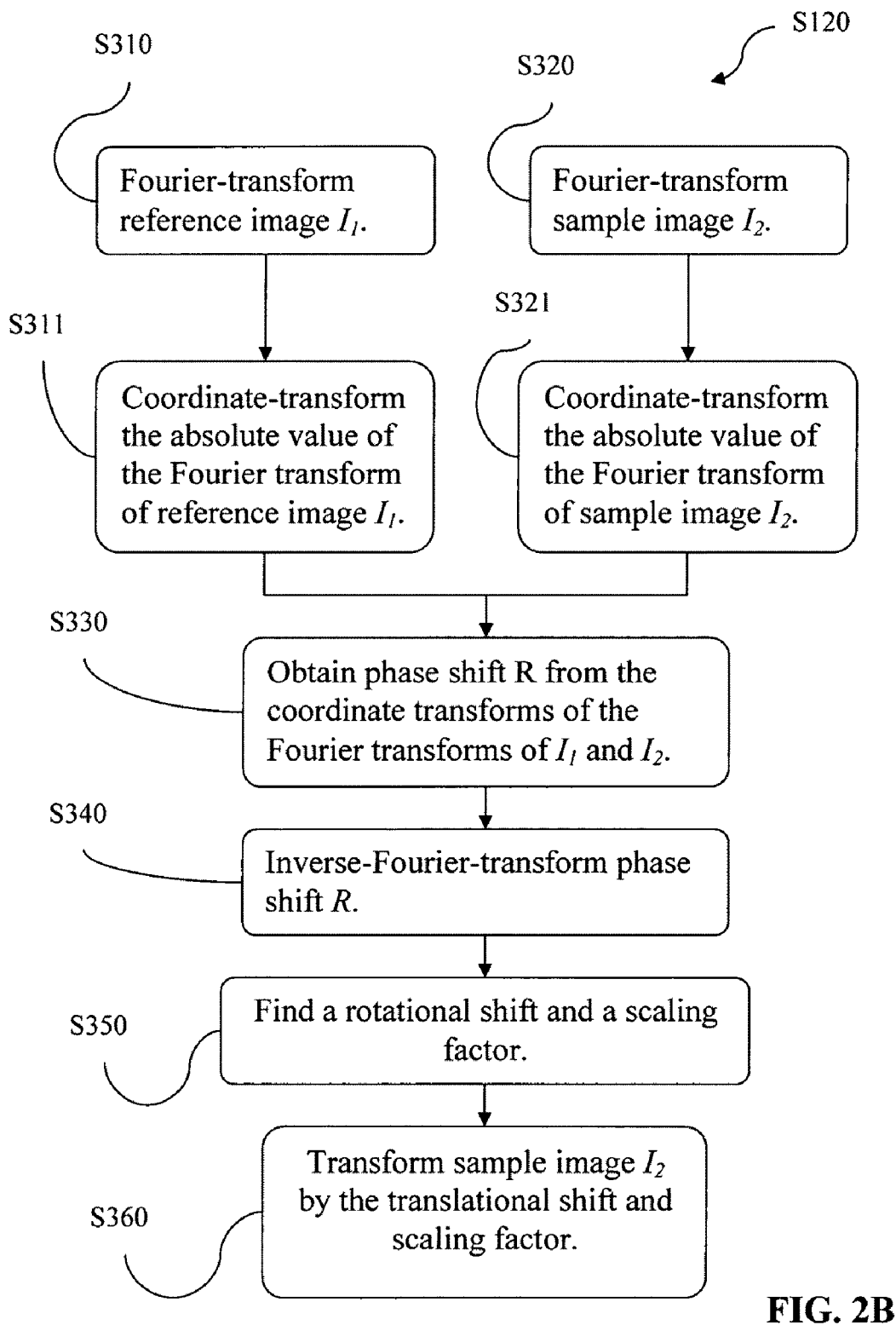
FIG. 2B shows steps of the process of the alignment by rotation and scaling.

FIG. 2B shows steps of the process of the alignment by rotation and scaling S120. This procedure is to align a sample image with a reference image by rotating or scaling the sample image to match the reference image. Scaling is enlarging or reducing the size of an image (i.e., zooming in and zooming out). This procedure can determine how much the rotation angle (or called rotational shift) and scaling factor are needed to align the two images.

Once a reference sample image $I_1$ and a sample image $I_2$ are selected as shown in step S110 of FIG. 1, the reference image $I_1$ and the sample image $I_2$ are Fourier-transformed as shown in steps S310 and S320. Fourier transforms $F_1(\xi, \eta)$ and $F_2(\xi, \eta)$ of images $I_1(x, y)$ and $I_2(x, y)$, respectively, are obtained. $\xi$ and $\eta$ are a vertical and a horizontal frequencies, respectively. To register scaled and rotated images, the abs($F_1(\xi, \eta)$) and abs($F_2(\xi, \eta)$) are converted from Cartesian rectangular coordinates into log-polar coordinates as shown in steps S311 and S321. The relationship between Cartesian coordinates (x, y) and log-polar coordinates ($\rho$, $\theta$) are indicated in Equations 5 and 6.

$$x=e^{log(\rho)} \cdot cos(\theta)$$ Equation 5

$$y=e^{log(\rho)} \cdot sin(\theta)$$ Equation 6 where $\rho$ is a radial coordinate and $\theta$ is an azimuthal coordinate.

The centers of the new images will be the low frequency components of abs($F_1(\xi, \eta)$) and abs($F_2(\xi, \eta)$). The original rotation and scaling in the polar coordinate system now become translational shift in the converted rectangular coordinate system, and the same procedure to acquire the translational shift can be used for rotation and scaling. In step S330, a rotational phase shift R is obtained by the use of Equation 3. In step S340, a Dirac delta function is obtained by inverse-Fourier-transforming the phase shift R by the use of Equation 4. In this case, scaling factor and rotational shift are obtained.

A bilinear interpolation is used to find the value on the log-polar grids from the original rectangular grids, and the values outside of the original grids are set to zero. To find the new maximum value M(x, y), corresponding to an value of Flp$_1$(log $\rho$, $\theta$) or Flp$_2$(log $\rho$, $\theta$), which is a coordinate transform of $F_1(\xi, \eta)$ or $F_2(\xi, \eta)$, respectively, on a grid point, the four adjacent intensities $M_{j,k}$, $M_{j+1,k}$, $M_{j,k+1}$, and $M_{j+1,k+1}$ on original grid points (j, k), (j+1, k) (j, k+1), and (j+1, k+1) are used as shown in Equation 7.

$$M(x,y)=M_{j,k}(1-t)(1-u)+M_{j+1,k}t(1-u)+M_{j,k+1}(1-t)u+M_{j+1,k+1}tu$$ Equation 7 where t and u are the fractional parts of x and y, respectively. In step S350, the rotational shift and a scaling factor are found by finding a location at which the Dirac delta function has a peak value. Specifically, a location $(x_1, y_1)$, at which the Dirac delta function is maximized, is found through the bilinear interpolation. By finding the location of the maximum P value, the scaling factor and rotational shift can be determined. The process described through steps S310 to S350 gives an accuracy of one pixel. In step S360, the sample image $I_2$ is transformed by the rotational shift and rescaled by the scaling factor, which are found in step S350.

As described above, the translational shift obtained through steps S210 to S250, and the scaling factor and the rotational shift obtained through steps S310 to S350 have an accuracy of one pixel. In order to improve the accuracy to fractional pixels, the step of S250 or S350 can include refinement process S400, which is shown in FIG. 3. In steps S250 and S350, location $(x_1, y_1)$, at which the Dirac delta function is maximized, is found. In the steps shown in FIG. 3, another grid point $(x_2, y_2)$ is found to identify the true transformation factor (translational, or scaling and rotational amount), which may be located between two grid points $(x_1, y_1)$ and $(x_2, y_2)$. In order to find the true transformation factor, magnitudes of Dirac delta function (the inverse Fourier transform of a phase shift), which is obtained in Equation 4, are compared at four grid points $(x_1 \pm 1, y_1 \pm 1)$ as shown in step S410. A grid point $(x_2, y_2)$, which has the largest magnitude of Dirac delta function among the four grid points $(x_1 \pm 1, y_1 \pm 1)$, is selected in step S420. In step S430, a true transformation factor (XT,YT) is found by the use of two grid points $(x_1, y_1)$ and $(x_2, y_2)$, and by the Equation 8 and Equation 9.

$$x_T = \frac{w_{x1}x_1 + w_{x2}x_2}{w_{x1} + w_{x2}} \quad \text{Equation 8}$$

$$y_T = \frac{w_{y1}y_1 + w_{y2}y_2}{w_{y1} + w_{y2}} \quad \text{Equation 9}$$

where $w_{xi}$ and $w_{yi}$ are defined in Equation 10 and Equation 11, respectively, and i stands for 1 or 2.

$$w_{xi} = f(|F(x_i, y_1)|) + f(|F(x_i, y_2)|) \quad \text{Equation 10}$$

$$w_{yi} = f(|F(x_1, y_i)|) + f(|F(x_2, y_i)|) \quad \text{Equation 11}$$

In Equations 10 and 11, F stands for a Fourier transform, and $f$ is an empirical function. In an example to demonstrate the alignment of images, the empirical function can be selected as $f(z)=z^\alpha$. The parameter $\alpha$ can be chosen as 0.65 for the alignment by translational shift, and can be chosen as 1.55 for the alignment by rotation and scaling. The present invention, however, is not limited to this empirical function and these values of the parameter $\alpha$. Any empirical function and a parameter of the empirical function can be selected based on experiment and optimization to accurately align the images.

An erosion-dilation filter can be used for the difference image of the reference image $I_1$ and the sample image $I_2 (dI=I_2-I_1)$. The erosion filter is a process using the minimum value of all eight neighboring pixels and the current pixel to replace the current pixel value. The dilation filter is a process using the maximum value of all eight neighboring pixels and the current pixel to replace the current pixel value. The filtered difference image is then added back to the reference image $I_1$ to generate the finalized sample image $I_2$. The erosion-dilation filter process is described as follows. In the first step, all pixels of the difference image are labeled as unprocessed. In the second step, for an unprocessed pixel, erosion filter is applied and the difference image is updated. The erosion filter is a process that finds a minimum value of all eight neighboring pixels and the current pixel, and replaces the current pixel value with the minimum value. In the third step, dilation filter is applied to the pixel of the difference image, and the difference image is updated. The dilation filter is a process that finds a maximum value of all eight neighboring pixels and the current pixel, and replaces the current pixel value with the maximum value. In the fourth step, the current pixel is labeled as processed. If there is an unprocessed pixel, the second through fourth steps are repeated for the unprocessed pixel. Otherwise the erosion-dilation process ends.

In the description of the method for alignment of images shown in FIGS. 1 through 3, the reference image $I_1$ and the sample image $I_2$ are represented in Cartesian coordinates. Therefore, in order to obtain rotational shift and scaling factor, the Fourier transforms of the images $I_1$ and $I_2$ are transformed into log-polar coordinates, as described in steps S311 and S321 of FIG. 2B.

In the steps shown in FIGS. 1 through 3, a rotational shift or a scaling factor can be referred to as a first transformation factor, and a translational shift can be referred to as a second transformation factor. In this case, the phase shift, which is used to obtain the rotational shift, can be referred to as a first phase shift, and another phase shift, which is used to obtain the translational shift, can be referred to as a second phase shift.

This method of the present invention for aligning two images can be used to align any pixel-based digital images that represent the same general scene or objects but have been shifted, rotated, or zoomed in or out (enlarged or reduced). This method also can be used as an automated image pre-processor to align images for subsequent analyses. It can also be used as a stand-alone image processor if the end objective of processing the images is to align them. The images to be processed by this method can be images captured by IR cameras, surveillance cameras, or any other imaging devices as long as they generate pixel-based digital images. This method may also be applied to data charts or images generated by data acquisition devices and computers.

Figure 4A:
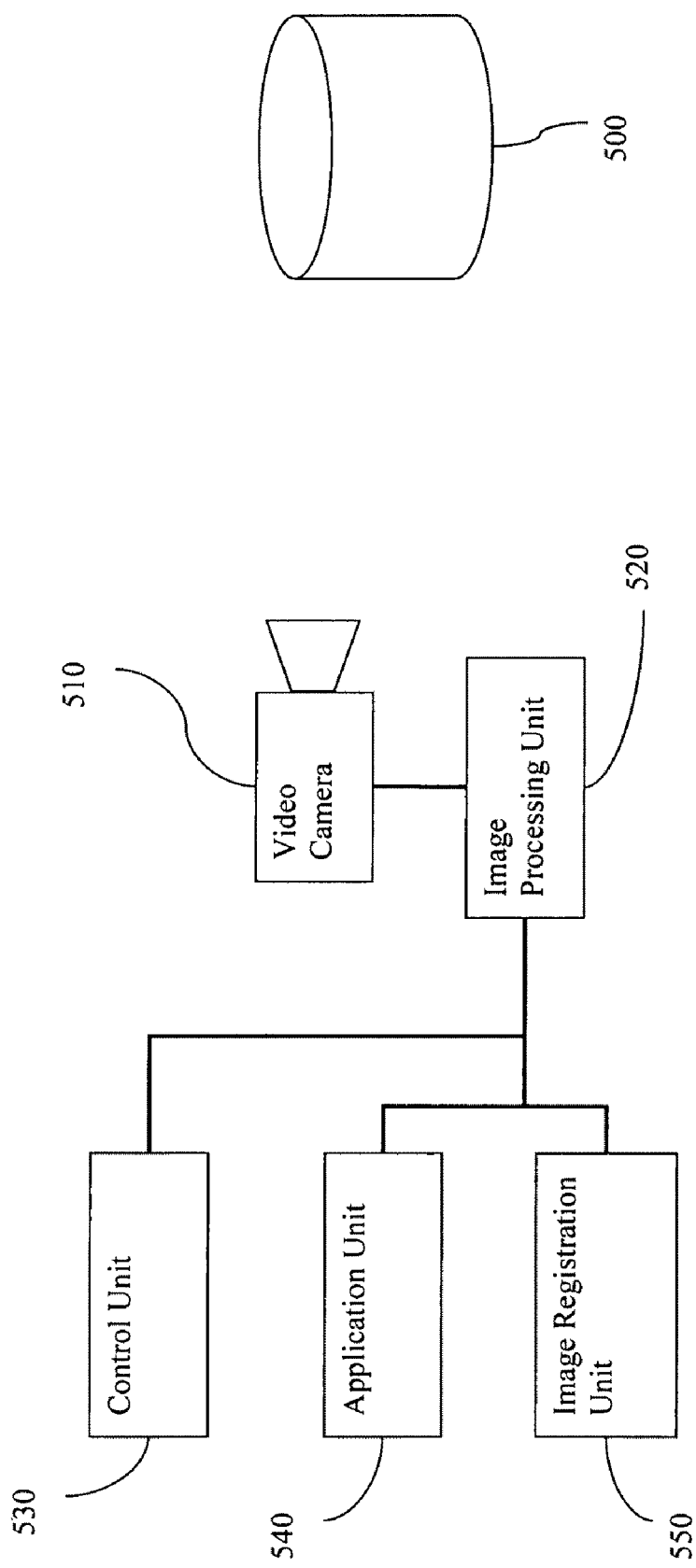
FIG. 4A shows an image alignment system constructed as an embodiment of the present invention.

The present invention also provides an apparatus to align a sample image to a reference image. FIG. 4A shows an apparatus that is capable of aligning two images. Video camera 510 takes images of object 500. Image processing unit 520 manipulates the images to further process the images. The images can be converted to a machine readable format such as a pixel based digital format in image processing unit 520. Image registration unit 550 includes an instruction that performs the steps shown in FIG. 1 to align images. If the instruction is written as a form of a computer program, image registration unit 550 can be a computer readable storage unit such as a memory and a compact disk. Application unit 540 is a unit that receives the aligned images from image registration unit 550, and uses the aligned images for a specific application. An example of application unit 540 can be a flickering image processing unit, which can be used to detect any change in the series of images. Specifically, the flickering image processing unit can be used to identify smoke-like VOC plume leaked from a tank by analyzing series of images taken by an infra-red (IR) camera. The flickering image process is known in the art, and a detailed description will be omitted. Control unit 530 controls overall data flows between image processing unit 520 and other units such as image registration unit 550 and application unit 540. Control unit 530, image registration unit 550, and application unit 540 can be separated devices. For example, control unit 530 can be included in a computer, and image registration unit 550 and application unit 540 can be included in separate devices that are connected to the computer through a wire or wireless means.

Figure 4B:
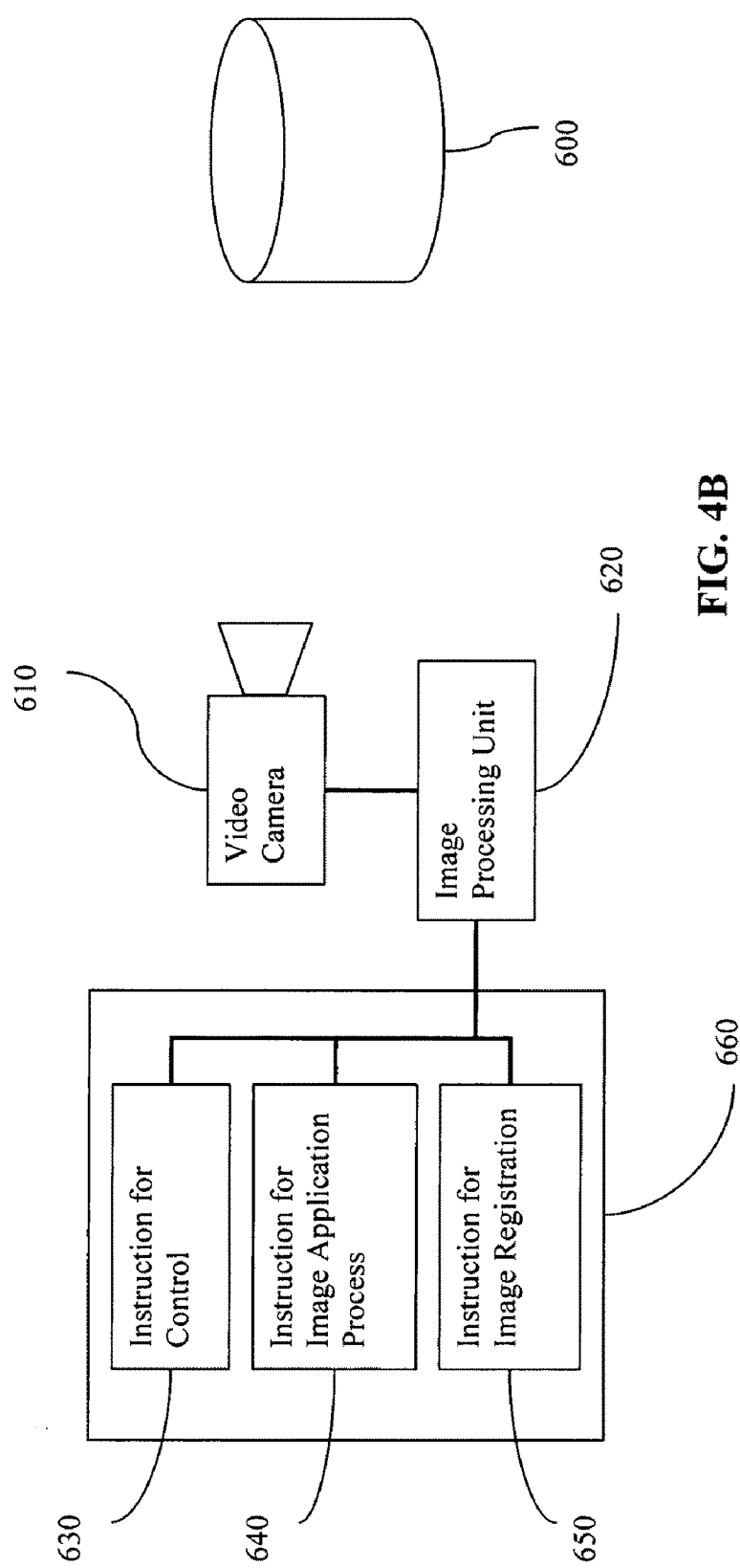
FIG. 4B shows an image alignment system constructed as another embodiment of the present invention.

FIG. 4B shows another embodiment of the apparatus of the present invention that is capable of aligning two images. The image alignment apparatus includes video camera 610, image processing unit 620, and a storage unit 660. Video camera 610 takes images of object 600. Image processing unit 620 manipulates the images to further process the images. The process for performing the alignment of images can be stored in a machine readable storage unit 660 as an operation instruction. In this case, instruction for image registration 650, instruction for image application process 640, and instruction for control 630 can be stored in storage unit 660. Instruction for image registration 650 includes operation instruction for aligning images according to the processes shown in FIG. 1. Instruction for image application process 640 includes operation instructions that receives aligned images, which are processed according to instruction for image registration, and uses the aligned images for a specific application. In the example described above, instruction for image application process can an instruction for flickering image process, which may include a method such as wavelet or Fourier transform to identify smoke in video through processing the pixel intensity time series. Instruction for control 630 can include an operation instruction for controlling the flow of image data between image processing unit 620 and storage unit 660. Storage unit 660 may be physically housed in a camera body or a separate device.

Hereafter, applications of the method for alignment of images will be descried. The process to align images is performed in the following steps.

First, a reference image $I_1$ and a sample image $I_2$ are chosen.

Second, a fast Fourier transform (FFT) is applied to the reference and sample images $I_1$ and $I_2$ to obtain the Fourier transforms $F_1$ and $F_2$, respectively.

Third, absolute values of $F_1$ and $F_2$ are coordinate-transformed from Cartesian coordinates into log-polar coordinates to obtain $Flp_1$ and $Flp_2$, respectively.

Fourth, FFT is applied to $Flp_1$ and $Flp_2$, and a phase shift R is obtained by the use of Equation 3. Herein, the Fourier transforms of $Flp_1$ and $Flp_2$ are used for $F_1$ and $F_2$ of Equation 3, respectively. The difference of the two new images $Flp_1$ and $Flp_2$ is a translational shift corresponding to the rotation and scaling in the original images. The translational shift in the original images disappears since the absolute values of the Fourier transforms are used. The original translations are represented by the phase shift and do not affect the absolute values of the Fourier transforms.

Fifth, an inverse Fourier transform P of the phase shift R is obtained by the use of Equation 4.

Sixth, a first location $(x_1, y_1)$, at which absolute value of P is maximized, is found.

Seventh, a second location $(x_2, y_2)$, at which absolute value of P is the largest, is selected among four points $(x_1 \pm 1, y_1 \pm 1)$.

Eighth, a rotational shift and a scaling factor are obtained by the use of Equations 8 through 11 with $f(z)=z^\alpha$ and $\alpha=1.55$. The sample image $I_2$ is rotated and rescaled by the rotational shift and by the scaling factor, respectively, to obtain a new sample image $I_2'$.

Ninth, a fast Fourier transform (FFT) is applied to the reference and the new sample images $I_1$ and $I_2'$ to obtain Fourier transforms of images $I_1$ and $I_2'$, and calculate a phase shift from these two Fourier transforms.

Tenth, an inverse Fourier transform P of the phase shift of ninth step is obtained. The sixth through eighth steps are repeated with $f(z)=z^\alpha$ and $\alpha=0.65$ to obtain a translational shift. The new sample image $I_2'$ is translated by the translational shift.

FIGS. 5A through 5D show images of the first example of the alignment method of the present invention. FIGS. 5A and 5B show two images to be aligned with each other. The image of FIG. 5A is a reference image, and the image of FIG. 5B is a sample image that will be transformed to match the reference image of FIG. 5A. Both images of FIGS. 5A and 5B have a width of 123 pixels and a height of 96 pixels. The image of FIG. 5B was created by translating the image of FIG. 5A to the right by 9 pixels, by translating to the bottom by 5 pixels, and by rotating anticlockwise by 17 degrees. The image of FIG. 5C is a direct overlay of the images of FIGS. 5A and 5B. The image of FIG. 5C shows that the two images of FIGS. 5A and 5B are not aligned.

Figure 6A:
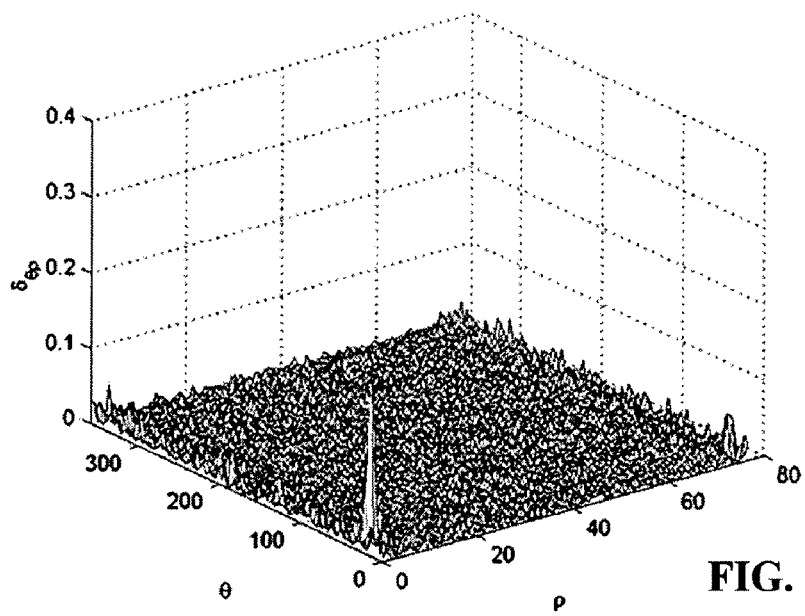
FIGS. 6A and 6B show Dirac delta functions to determine a rotational shift and a translational shift, respectively.
Figure 6B:
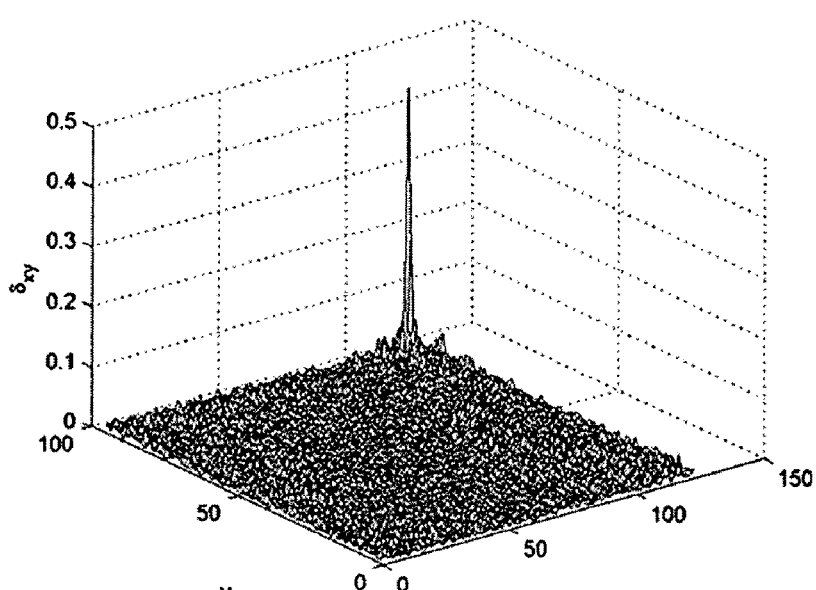

The image of FIG. 5B was transformed through the steps shown in FIGS. 1 through 3, more specifically through the first step to tenth step described above. FIG. 6A shows the Dirac delta function to determine the rotational shift and the scaling factor, and FIG. 6B shows the Dirac delta function to determine the translation. The maximum value in FIG. 6A is at (15, 1), indicating the rotation is 15 degrees and no scaling (the scaling factor is around one). The maximum value in FIG. 6B is at (92, 115). Because the two values exceed their respective half width and half height of the original image shown in FIG. 5A, the image of FIG. 5B should be shifted toward the origin and the amount of shift is the width and height minus the maximum value location, i.e. horizontally 9 pixels and vertically 5 pixels (where the height and width is added by one pixel since a location exactly at the height or width indicates one pixel shift). After the interpolation, the calculated translation was 9.28 pixels and 5.37 pixels, and the calculated rotation was 16.2 degrees. After applying these transforms to the image of FIG. 5B, the transformed image was overlaid on the image of FIG. 5A. FIG. 5D shows the overlay of the image of FIG. 5A and the transformed image of FIG. 5B. As shown in FIG. 5D, the transformed image is well aligned to the image of FIG. 5A.

Figures 7A, 7B, 7C:
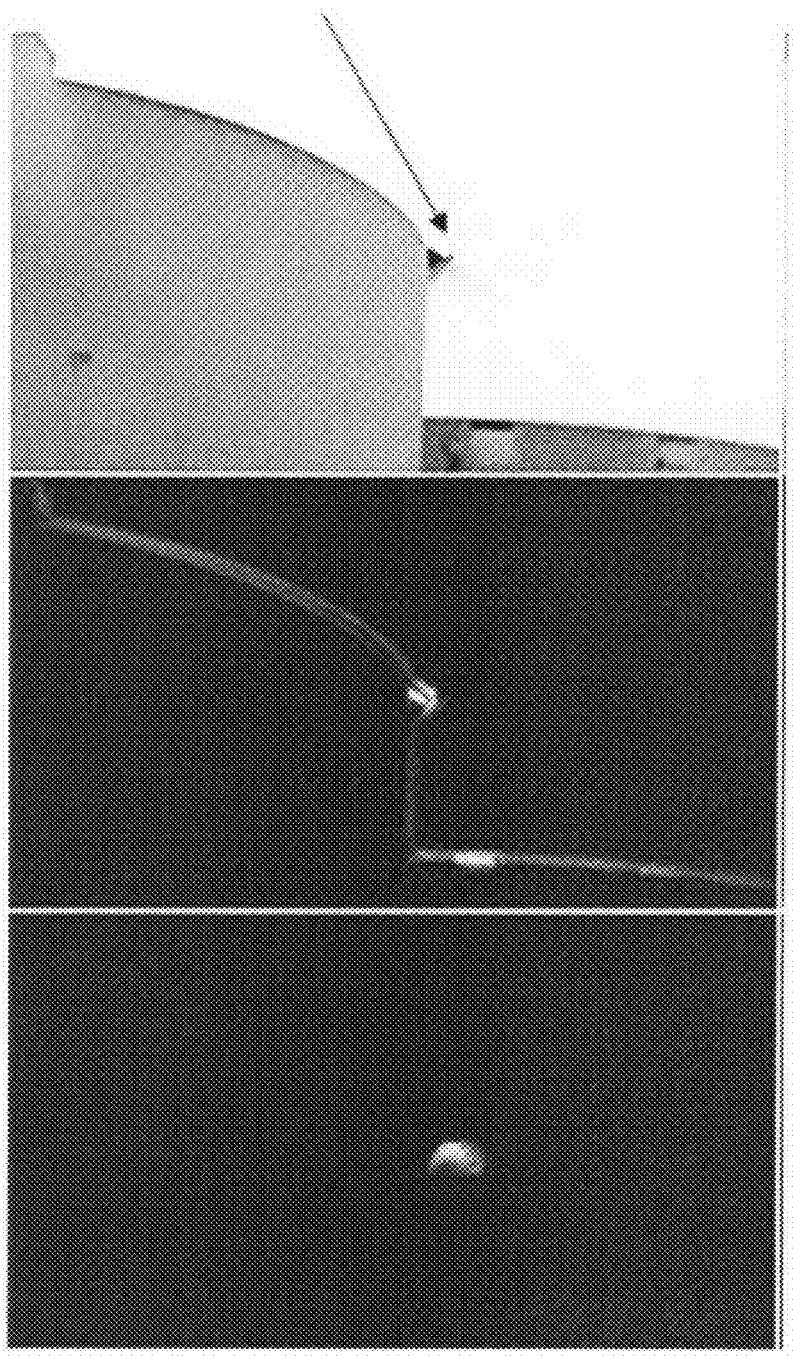
FIG. 7A shows a photo of a tank that has a leak, which is taken as a second example of the alignment method of the present invention.
FIG. 7B shows a photo of a flickering image to detect the leak without the alignment process of the present invention.
FIG. 7C shows a photo of a flickering image to detect the leak after the alignment process of the present invention.

For second example of the application of the method for alignment of images, an infrared (IR) video clip was taken from a chemical plant, and the video clip was analyzed. The IR video camera is manufactured by FLIR Corporation. The video contains 100 frames at 23 frames per second. The image of FIG. 7A is a snapshot from the video, and the snapshot image is presented to provide a general idea of the volatile organic compounds (VOC) leaking situation. The tank shown in FIG. 7A has a leak as indicated by an arrow. The video was taken with the IR camera that was pointed to the leaking tank. The frame in the video, however, was constantly shifting due to the movement of the camera operator. The VOC plume in the video is easily recognizable by human eyes. The challenge is to recognize the VOC plume using some image processing systems without human intervention. This task is even more challenging when the video frame is constantly shifting and rotating due to an unsteady camera operation.

When gas is released into the air from the tank, the concentration of the gas fluctuates at certain frequencies caused by atmospheric turbulence, which is similar to the phenomena observed in fire and smoke motions in the air. This characteristic flickering frequency is at 1 Hz to 5 Hz. The pixel intensity at a location of all frames forms a time series. Frequency based method, such as wavelet or Fourier transform, can be used to identify smoke in videos through processing the pixel intensity time series. Fourier transforms are performed on the frames of original video clip to identify the smoke, but without an image alignment process of the present invention. The 1 Hz Fourier power forms a new flickering image. FIG. 7B shows a photo of a flickering image to detect the leak without the alignment process of the present invention. In FIG. 7B, bright lines are shown along the edges of the tank, so that the location of smoke cannot be clearly identified in the photo of FIG. 7B. The bright lines are generated by unaligned image frames that are caused by the vibration of the IR camera during recording.

By using the method described above, the frames of the video are aligned to its first frame. During the alignment process, the amount of translational and rotational shift was recorded. It was found that the horizontal and vertical shifts were up to approximately 15 pixels, and the scaling factor was around 1. There was a rotational shift up to 1 degree. After the alignment, Fourier transform is performed to form the flickering image to identify the smoke. FIG. 7C shows a photo of a flickering image to detect the leak after the alignment process of the present invention. In FIG. 7C, the flickering image shows a single hot spot for the leaking gas. The noisy intensities (bright lines), as shown in FIG. 7B, formed along the edges of the tank caused by the camera motions are minimized in FIG. 7C, and the effect of Fourier transform for the flickering image is greatly improved by aligning the video frames.

The video frame alignment method of the present invention is fast and robust. As a preprocessing method, it will also be useful for a wide range of other video data processing purposes, including, but not limited to, hyper-spectral video images, VOC emission rate quantification based on IR camera videos, and other video processing applications involving plume-like targets.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for aligning image frames, comprising steps of:
   selecting a reference image;
   selecting a sample image to be aligned to the reference image;
   Fourier-transforming the reference image to obtain a Fourier transform of the reference image;
   Fourier-transforming the sample image to obtain a Fourier transform of the sample image;
   coordinate-transforming an absolute value of the Fourier transform of the reference image to obtain a coordinate-transformed Fourier transform of the reference image;
   coordinate-transforming an absolute value of the Fourier transform of the sample image to obtain a coordinate-transformed Fourier transform of the sample image;
   obtaining a first phase shift from the coordinate-transformed Fourier transform of the reference image and the coordinate-transformed Fourier transform of the sample image;
   inverse-Fourier-transforming the first phase shift to obtain an inverse Fourier transform of the first phase shift;
   finding a first transformation factor from the inverse Fourier transform of the first phase shift;
   transforming the sample image by the first transformation factor to obtain a first-transformed sample image;
   Fourier-transforming the first-transformed sample image to obtain a Fourier transform of the first-transformed sample image;
   obtaining a second phase shift of the Fourier transform of the reference image and the Fourier transform of the first-transformed sample image;
   inverse-Fourier-transforming the second phase shift to obtain an inverse Fourier transform of the second phase shift;
   finding a second transformation factor from the inverse Fourier transform of the second phase shift; and
   transforming the first-transformed sample image by the second transformation factor.

2. The method of claim 1, comprised of each of the reference image and the sample image being represented in Cartesian coordinates.

3. The method of claim 2, comprised of the step of coordinate-transforming the absolute value of the Fourier transform of the reference image including a step of transforming an absolute value of the Fourier transform of the reference image from Cartesian coordinates to log-polar coordinates; and
   comprised of the step of coordinate-transforming the absolute value of the Fourier transform of the sample image including a step of transforming an absolute value of the Fourier transform of the sample image from Cartesian coordinates to log-polar coordinates.

4. The method of claim 3, comprised of the first transformation factor including a rotational shift, by which the sample image is rotated to be aligned to the reference image.

5. The method of claim 4, comprised of the first transformation factor including a scaling factor, by which the sample image is rescaled to be aligned to the reference image.

6. The method of claim 4, comprised of the second transformation factor including a translational shift, by which the sample image is translated to be aligned to the reference image.

7. The method of claim 6, comprised of the step of finding the second transformation factor comprising steps of:
   finding a first location $(x_1, y_1)$ at which the inverse Fourier transform of the second phase shift is maximized;
   finding a second location $(x_2, y_2)$ among four points $(x_1 \pm 1, y_1 \pm 1)$ at which the inverse Fourier transform of the second phase shift is the largest; and
   finding the translational shift from formulas $$x_T = \frac{w_{x1}x_1 + w_{x2}x_2}{w_{x1} + w_{x2}}$$

$$y_T = \frac{w_{y1}y_1 + w_{y2}y_2}{w_{y1} + w_{y2}}$$

where $(x_T, y_T)$ is the translational shift, and $w_{xi}$ and $w_{yi}$ are defined by formulas $$w_{xi} = f(|F(x_i, y_1)|) + f(|F(x_i, y_2)|)$$

$$w_{yi} = f(|F(x_1, y_i)|) + f(|F(x_2, y_i)|)$$

where i stands for 1 or 2, F stands for Fourier transform, and $f$ is an empirical function.

8. The method of claim 7, comprised of the empirical function including a function of $f(z) = z^\alpha$, where $\alpha$ is a parameter.

9. The method of claim 1, comprised of the step of finding a first transformation factor comprising steps of:
   finding a first location $(x_1, y_1)$ at which the inverse Fourier transform of the first phase shift is maximized; and
   finding a second location $(x_2, y_2)$ among four points $(x_1 \pm 1, y_1 \pm 1)$ at which the inverse Fourier transform of the first phase shift is the largest.

10. The method of claim 1, comprised of the step of obtaining the first phase shift including a step of calculating the first phase shift from a formula $$R_1 = \frac{F_1(\xi, \eta) \cdot conj(F_2(\xi, \eta))}{abs(F_1(\xi, \eta)) \cdot abs(F_2(\xi, \eta))}; \text{ and}$$

comprised of the step of obtaining the second phase shift including a step of calculating the second phase shift from a formula $$R_2 = \frac{F_1(\xi, \eta) \cdot conj(F_2'(\xi, \eta))}{abs(F_1(\xi, \eta)) \cdot abs(F_2'(\xi, \eta))}$$

where $R_1$ is the first phase shift, $R_2$ is the second phase shift, $F_1(\xi, \eta)$ is the Fourier transform of the reference image, $F_2(\xi, \eta)$ is the coordinate-transformed Fourier transform of the sample image, $F_2'(\xi, \eta)$ is the Fourier transform of the first-transformed sample image, $\xi$ and $\eta$ are a vertical and a horizontal frequencies, respectively, conj is a complex conjugate, and abs is an absolute value.

11. The method of claim 1, further comprising:
    applying an erosion-dilation filter to process a difference image of the reference image and the transformed first-transformed sample image; and
    reconstructing the transformed first-transformed sample image by adding the difference image to the reference image.

12. A non-transitory machine readable storage medium providing instructions that cause the machine to perform operations to align image frames, the operations comprising:
    selecting a reference image that is represented in Cartesian coordinates;
    selecting a sample image to be aligned to the reference image, the sample image being represented in Cartesian coordinates;
    Fourier-transforming the reference image to obtain a Fourier transform of the reference image;
    Fourier-transforming the sample image to obtain a Fourier transform of the sample image;
    coordinate-transforming an absolute value of the Fourier transform of the reference image from Cartesian coordinates to log-polar coordinates to obtain a coordinate-transformed Fourier transform of the reference image;
    coordinate-transforming an absolute value of the Fourier transform of the sample image from Cartesian coordinates to log-polar coordinates to obtain a coordinate-transformed Fourier transform of the sample image;
    obtaining a rotational phase shift from the coordinate-transformed Fourier transform of the reference image and the coordinate-transformed Fourier transform of the sample image;
    inverse-Fourier-transforming the rotational phase shift to obtain an inverse Fourier transform of the rotational phase shift;
    finding a rotational shift from the inverse Fourier transform of the rotational phase shift;
    rotating the sample image by the rotational shift to obtain a rotated sample image;
    Fourier-transforming the rotated sample image to obtain a Fourier transform of the rotated sample image;
    obtaining a translational phase shift of the Fourier transform of the reference image and the Fourier transform of the rotated sample image;
    inverse-Fourier-transforming the translational phase shift to obtain an inverse Fourier transform of the translational phase shift;
    finding a translational shift from the inverse Fourier transform of the translational phase shift; and
    translating the rotated sample image by the translational shift.

13. The non-transitory machine readable storage medium of claim 12, the operations further comprising:
    finding a scaling factor from the inverse Fourier transform of the rotational phase shift; and
    rescaling the sample image by the scaling factor.

14. The non-transitory machine readable storage medium of claim 12, wherein the step of obtaining the rotational phase shift includes a step of calculating the rotational phase shift from a formula $$R = e^{-j2\pi(\xi \cdot dx + \eta \cdot dy)} = \frac{Flp_1(\xi, \eta) \cdot conj(Flp_2(\xi, \eta))}{abs(Flp_1(\xi, \eta)) \cdot abs(Flp_2(\xi, \eta))}$$

where R is the rotational phase shift, $Flp_1(\xi, \eta)$ is the coordinate-transformed Fourier transform of the reference image, $Flp_2(\xi, \eta)$ is the coordinate-transformed Fourier transform of the sample image, $\xi$ and $\eta$ are a vertical and a horizontal frequencies, respectively, conj is a complex conjugate, and abs is an absolute value.

15. The non-transitory machine readable storage medium of claim 12, wherein the step of obtaining the translational phase shift includes a step of calculating the translational phase shift from a formula $$R = e^{-j2\pi(\xi \cdot dx + \eta \cdot dy)} = \frac{F_1(\xi, \eta) \cdot conj(F_2(\xi, \eta))}{abs(F_1(\xi, \eta)) \cdot abs(F_2(\xi, \eta))}$$

where R is the translational phase shift, $F_1(\xi, \eta)$ is the Fourier transform of the reference image, $F_2(\xi, \eta)$ is the Fourier transform of the rotated sample image, $\xi$ and $\eta$ are a vertical and a horizontal frequencies, respectively, conj is a complex conjugate, and abs is an absolute value.

16. The non-transitory machine readable storage medium of claim 12, wherein the step of finding a rotational shift includes steps of:
    finding a first location $(x_1, y_1)$ at which the inverse Fourier transform of the rotational shift is maximized; and
    finding a second location $(x_2, y_2)$ among four points $(x_1 \pm 1, y_1 \pm 1)$ at which the inverse Fourier transform of the rotational shift is the largest.

17. The non-transitory machine readable storage medium of claim 12, wherein the step of finding the translational shift comprises steps of:
    finding a first location $(x_1, y_1)$ at which the inverse Fourier transform of the translational shift is maximized;
    finding a second location $(x_2, y_2)$ among four points $(x_1 \pm 1, y_1 \pm 1)$ at which the inverse Fourier transform of the translational shift is the largest; and
    finding the translational shift from formulas $$x_T = \frac{w_{x1} x_1 + w_{x2} x_2}{w_{x1} + w_{x2}}$$

$$y_T = \frac{w_{y1} y_1 + w_{y2} y_2}{w_{y1} + w_{y2}}$$

where $(x_T, y_T)$ is the translational shift, and $w_{xi}$ and $w_{yi}$ are defined by formulas $$w_{xi} = f(|F(x_i, y_1)|) + f(|F(x_i, y_2)|)$$

$$w_{y,i} = f(|F(x_1, y_i)|) + f(|F(x_2, y_i)|)$$

where i stands for 1 or 2, F stands for Fourier transform, and $f$ is an empirical function.

18. The non-transitory machine readable storage medium of claim 17, wherein the empirical function includes a function of $f(z) = z^\alpha$, where $\alpha$ is a parameter.

19. The non-transitory machine readable storage medium of claim 12, the operations further comprising:

applying an erosion-dilation filter to process a difference image of the reference image and the transformed first-transformed sample image; and reconstructing the transformed first-transformed sample image by adding the difference image to the reference image.

* * * * *